United States Patent
Ye et al.

(10) Patent No.: US 10,492,225 B2
(45) Date of Patent: Nov. 26, 2019

(54) LISTEN BEFORE TALK FOR DISCOVERY REFERENCE SIGNAL TRANSMISSION IN UNLICENSED SPECTRUM

(71) Applicant: Intel IP Corporation, Santa Clara, CA (US)

(72) Inventors: Qiaoyang Ye, Fremont, CA (US); Hwan-Joon Kwon, Santa Clara, CA (US); Abhijeet Bhorkar, Fremont, CA (US); Jeongho Jeon, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/767,219

(22) PCT Filed: Mar. 15, 2016

(86) PCT No.: PCT/US2016/022447
§ 371 (c)(1),
(2) Date: Apr. 10, 2018

(87) PCT Pub. No.: WO2017/078775
PCT Pub. Date: May 11, 2017

(65) Prior Publication Data
US 2019/0075596 A1 Mar. 7, 2019

Related U.S. Application Data (60) Provisional application No. 62/251,566, filed on Nov. 5, 2015.

(51) Int. Cl.
*H04W 74/08* (2009.01)
*H04L 5/00* (2006.01)
*H04W 48/16* (2009.01)

(52) U.S. Cl.
CPC ....... *H04W 74/0816* (2013.01); *H04L 5/0035* (2013.01); *H04L 5/0048* (2013.01);
(Continued)

(58) Field of Classification Search
CPC ... H04L 5/0035; H04L 5/0048; H04L 5/0053; H04L 5/0073; H04L 5/0082; H04W 48/16; H04W 74/0816
See application file for complete search history.

(56) References Cited

U.S. PATENT DOCUMENTS

2005/0208956 A1* 9/2005 Takagi ............... H04W 74/0816
455/464
2016/0127098 A1* 5/2016 Ng ........................ H04L 5/0048
370/329

(Continued)

OTHER PUBLICATIONS

International Search Report dated Jun. 13, 2016 for International Application PCT/US2016/22447.

(Continued)

*Primary Examiner* — Stephen J Clawson
(74) *Attorney, Agent, or Firm* — Eschweiler & Potashnik, LLC (57) ABSTRACT

Techniques for mobile communication in an unlicensed frequency band are discussed. A network device (e.g., an evolved NodeB, or other cell network device) can generate a listen before talk (LBT) protocol in order to determine whether an unlicensed carrier of a secondary cell device is idle or busy. The LBT protocol can be generated as a one shot LBT within a two symbol duration of a potential downlink (DL) transmission burst, or multiple times within the two symbol duration. In response to an idle state detection, a discovery reference signal (DRS) can be transmitted. In response to the LBT protocol and the DRS transmission being misaligned, a reservation signal can be (Continued)

generated to reserve the unlicensed carrier for the DL transmission.

23 Claims, 6 Drawing Sheets

(52) U.S. Cl.
CPC .......... *H04L 5/0053* (2013.01); *H04L 5/0073* (2013.01); *H04L 5/0082* (2013.01); *H04W 48/16* (2013.01)

(56) References Cited

U.S. PATENT DOCUMENTS

| | | | |
|---|---|---|---|
| 2016/0302230 A1* | 10/2016 | Novlan | H04B 17/318 |
| 2017/0048808 A1* | 2/2017 | Huang | H04W 52/52 |
| 2018/0213562 A1* | 7/2018 | Cierny | H04W 74/0808 |
| 2018/0241486 A1* | 8/2018 | Heo | H04W 24/10 |
| 2018/0323923 A1* | 11/2018 | Wang | H04L 5/0053 |
| 2018/0331774 A1* | 11/2018 | Ye | H04J 11/0069 |

OTHER PUBLICATIONS

"3rd Generation Partnership Project; Technical Specification Group Radio Access Network; Study on Licensed-Assisted Access to Unlicensed Spectrum; (Release 13)." 3GPP TR 36.889 V13.0.0 (Jun. 2015) Lte Advance. 87 pages.

"3rd Generation Partnership Project; Technical Specification Group Radio Access Network; Study on Licensed-Access to Unlicensed Spectrum; (Release 13)." 3GPP TR 36.889 V13.0.0 (Jun. 2015) Lte Advance, Annex B1. 125 pages.

"3rd Generation Partnership Project; Technical Specification Group Radio Access Network; Study on Licensed-Access to Unlicensed Spectrum; (Release 13)." 3GPP TR 36.889 V13.0.0 (Jun. 2015) Lte Advance. Annex B2. 53 pages.

"3rd Generation Partnership Project; Technical Specification Group Radio Access Network: Study on Licensed-Assisted Access to Unlicensed Spectrum; (Release 13)." 3GPP TR 36.889 V13.0.0 (Jun. 2015) Lte Advance. Annex B3. 20 pages.

"Further 6 considerations on the essential functionalities for LAA." Source: Kyocera. Agenda Item: 6.3.2.2. 3GPP TSG RAN WG1 Meeting #79, San Francisco, USA, Nov. 17-21, 2014. R1-144955. 10 pages.

"Enhanced DRS Design for LAA." Source: MediaTek Inc. Agenda Item: 7.2.3.2.1. 3GPP TSG RAN WG1 Meeting #82b, Malmoe, Sweden, Oct. 5-9, 2015. 8 pages.

\* cited by examiner

LISTEN BEFORE TALK FOR DISCOVERY REFERENCE SIGNAL TRANSMISSION IN UNLICENSED SPECTRUM

REFERENCE TO RELATED APPLICATIONS

This application is a National Phase entry application of International Patent Application No. PCT/US2016/022447filed Mar. 15, 2016, which claims priority to of U.S. Provisional Application 62/251,566filed on Nov. 5, 2015, entitled "LISTEN BEFORE TALK FOR DISCOVERY REFERENCE SIGNAL TRANSMISSION IN UNLICENSED SPECTRUM" in the name of Qiaoyang Ye et al. and is hereby incorporated by reference in its entirety.

FIELD

The present disclosure relates to wireless technology, and more specifically to techniques for implementing listen before talk (LBT) for discovery reference signal (DRS) transmission in unlicensed band operation of a wireless system.

BACKGROUND

The scarcity of licensed spectrum for cellular communications below 6 GHz has driven interest in unlicensed bands for LTE (Long Term Evolution) operation. In particular, the less crowded 5 GHz bands (currently used mostly for WiFi) have been proposed for LTE deployment, offering the potential for a substantial increase in LTE throughput. Overall, the design principles for LTE-U (LTE in Unlicensed spectrum) include integration with the licensed spectrum, minimal change to the existing LTE air-interface, and guaranteed co-existence with other systems using unlicensed spectrum, such as WiFi. Recently, Licensed Assisted Access (LAA) is a new technology considered in LTE Release 13 to meet the ever increasing demand for high data rate in wireless cellular networks by utilizing the carrier aggregation feature supported in LTE-A (LTE Advanced) to combine the data transmission over licensed primary carrier and unlicensed secondary component carriers. The 5 GHz band is of current interest in 3GPP (the Third Generation Partnership Project). For fair coexistence with the incumbent systems at the 5 GHz band, such as IEEE (the Institute of Electrical and Electronics Engineers) 802.11 based wireless local area networks (WLAN), Listen-Before-Talk (LBT) is considered as a mandatory feature of Release 13 LAA system.

Listen before talk (LBT) is an important feature for co-existence in the unlicensed band, wherein a transmitter listens to detect potential interference on the channel, only transmitting in the absence of interfering signals above a given threshold. Furthermore, different regions such as Europe have regulations concerning LBT for operation in unlicensed bands. WiFi devices use carrier sense multiple access with collision avoidance (CSMA/CA) as an LBT scheme, for example.

DETAILED DESCRIPTION

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 1:
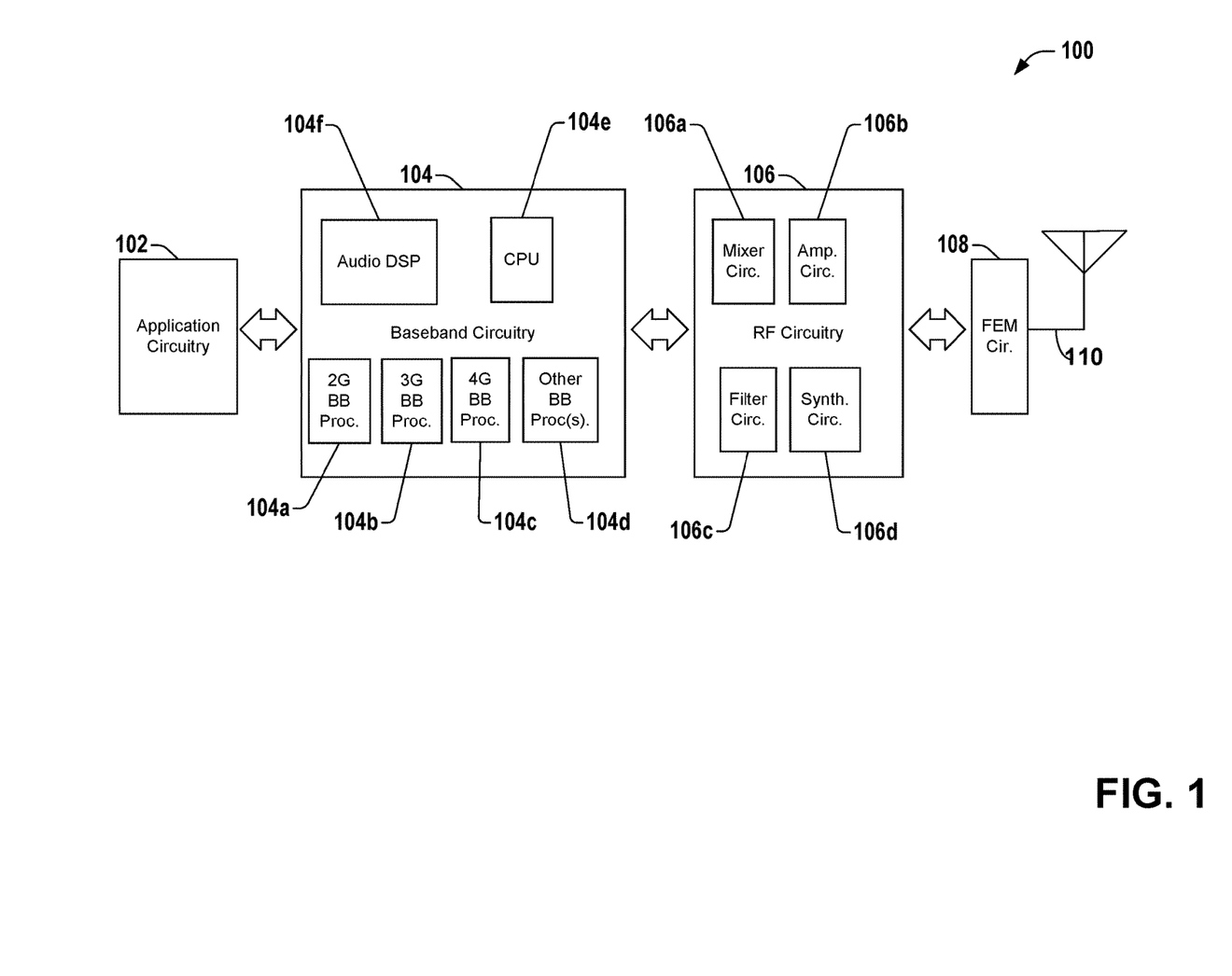
FIG. 1 is a block diagram illustrating an example network device useable in connection with various aspects described herein.

Embodiments described herein can be implemented into a system using any suitably configured hardware and/or software. FIG. 1 illustrates, for one embodiment, example components of a cell network device 100, such as a base station, a macro cell network device, a secondary cell network device, a small cell network device, an evolved/enhanced NodeB (eNB), or any other network device (e.g. a user equipment, pico cell, Femto cell or the like). In some embodiments, the cell network device 100 can include application circuitry 102, baseband circuitry 104, Radio Frequency (RF) circuitry 106, front-end module (FEM) circuitry 108 and one or more antennas 110, coupled together at least as shown.

The application circuitry 102 can include one or more application processors. For example, the application circuitry 102 can include circuitry such as, but not limited to, one or more single-core or multi-core processors. The processor(s) can include any combination of general-purpose processors and dedicated processors (e.g., graphics processors, application processors, etc.). The processors can be coupled with and/or can include memory/storage and can be configured to execute instructions stored in the memory/storage to enable various applications and/or operating systems to run on the system.

The baseband circuitry 104 can include circuitry such as, but not limited to, one or more single-core or multi-core processors. The baseband circuitry 104 can include one or more baseband processors and/or control logic to process baseband signals received from a receive signal path of the RF circuitry 106 and to generate baseband signals for a transmit signal path of the RF circuitry 106. Baseband processing circuitry 104 can interface with the application circuitry 102 for generation and processing of the baseband signals and for controlling operations of the RF circuitry 106. For example, in some embodiments, the baseband circuitry 104 can include a second generation (2G) baseband processor 104a, third generation (3G) baseband processor 104b, fourth generation (4G) baseband processor 104c, and/or other baseband processor(s) 104d for other existing generations, generations in development or to be developed in the future (e.g., fifth generation (5G), 6G, etc.). The baseband circuitry 104 (e.g., one or more of baseband processors 104a-d) can handle various radio control functions that enable communication with one or more radio networks via the RF circuitry 106. The radio control functions can include, but are not limited to, signal modulation/demodulation, encoding/decoding, radio frequency shifting, etc. In some embodiments, modulation/demodulation circuitry of the baseband circuitry 104 can include Fast-Fourier Transform (FFT), precoding, and/or constellation mapping/demapping functionality. In some embodiments, encoding/decoding circuitry of the baseband circuitry 104 can include convolution, tail-biting convolution, turbo, Viterbi, and/or Low Density Parity Check (LDPC) encoder/decoder functionality. Embodiments of modulation/demodulation and encoder/decoder functionality are not limited to these examples and can include other suitable functionality in other embodiments.

In some embodiments, the baseband circuitry 104 can include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 104e of the baseband circuitry 104 can be configured to run elements of the protocol stack for signaling of the PHY, MAC, RLC, PDCP and/or RRC layers. In some embodiments, the baseband circuitry can include one or more audio digital signal processor(s) (DSP) 104f. The audio DSP(s) 104f can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 104 and the application circuitry 102 can be implemented together such as, for example, on a system on a chip (SOC).

In some embodiments, the baseband circuitry 104 can provide for communication compatible with one or more radio technologies. For example, in some embodiments, the baseband circuitry 104 can support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 104 is configured to support radio communications of more than one wireless protocol can be referred to as multi-mode baseband circuitry.

RF circuitry 106 can enable communication with wireless networks using modulated electromagnetic radiation through a non-solid medium. In various embodiments, the RF circuitry 106 can include switches, filters, amplifiers, etc. to facilitate the communication with the wireless network. RF circuitry 106 can include a receive signal path which can include circuitry to down-convert RF signals received from the FEM circuitry 108 and provide baseband signals to the baseband circuitry 104. RF circuitry 106 can also include a transmit signal path which can include circuitry to up-convert baseband signals provided by the baseband circuitry 104 and provide RF output signals to the FEM circuitry 108 for transmission.

In some embodiments, the RF circuitry 106 can include a receive signal path and a transmit signal path. The receive signal path of the RF circuitry 106 can include mixer circuitry 106a, amplifier circuitry 106b and filter circuitry 106c. The transmit signal path of the RF circuitry 106 can include filter circuitry 106c and mixer circuitry 106a. RF circuitry 106 can also include synthesizer circuitry 106d for synthesizing a frequency for use by the mixer circuitry 106a of the receive signal path and the transmit signal path. In some embodiments, the mixer circuitry 106a of the receive signal path can be configured to down-convert RF signals received from the FEM circuitry 108 based on the synthesized frequency provided by synthesizer circuitry 106d. The amplifier circuitry 106b can be configured to amplify the down-converted signals and the filter circuitry 106c can be a low-pass filter (LPF) or band-pass filter (BPF) configured to remove unwanted signals from the down-converted signals to generate output baseband signals. Output baseband signals can be provided to the baseband circuitry 104 for further processing. In some embodiments, the output baseband signals can be zero-frequency baseband signals, although this is not a requirement. In some embodiments, mixer circuitry 106a of the receive signal path can comprise passive mixers, although the scope of the embodiments is not limited in this respect.

In some embodiments, the mixer circuitry 106a of the transmit signal path can be configured to up-convert input baseband signals based on the synthesized frequency provided by the synthesizer circuitry 106d to generate RF output signals for the FEM circuitry 108. The baseband signals can be provided by the baseband circuitry 104 and can be filtered by filter circuitry 106c. The filter circuitry 106c can include a low-pass filter (LPF), although the scope of the embodiments is not limited in this respect.

In some embodiments, the mixer circuitry 106a of the receive signal path and the mixer circuitry 106a of the transmit signal path can include two or more mixers and can be arranged for quadrature down-conversion or up-conversion respectively. In some embodiments, the mixer circuitry 106a of the receive signal path and the mixer circuitry 106a of the transmit signal path can include two or more mixers and can be arranged for image rejection (e.g., Hartley image rejection). In some embodiments, the mixer circuitry 106a of the receive signal path and the mixer circuitry 106a can be arranged for direct down-conversion or direct up-conversion, respectively. In some embodiments, the mixer circuitry 106a of the receive signal path and the mixer circuitry 106a of the transmit signal path can be configured for super-heterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 106 can include analog-to-digital converter (ADC) and digital-to-analog converter (DAC) circuitry and the baseband circuitry 104 can include a digital baseband interface to communicate with the RF circuitry 106.

In some dual-mode embodiments, a separate radio IC circuitry can be provided for processing signals for each spectrum, although the scope of the embodiments is not limited in this respect.

In some embodiments, the synthesizer circuitry 106d can be a fractional-N synthesizer or a fractional N/N+1 synthesizer, although the scope of the embodiments is not limited in this respect as other types of frequency synthesizers can be suitable. For example, synthesizer circuitry 106d can be a delta-sigma synthesizer, a frequency multiplier, or a synthesizer comprising a phase-locked loop with a frequency divider.

The synthesizer circuitry 106d can be configured to synthesize an output frequency for use by the mixer circuitry 106a of the RF circuitry 106 based on a frequency input and a divider control input. In some embodiments, the synthesizer circuitry 106d can be a fractional N/N+1 synthesizer.

In some embodiments, frequency input can be provided by a voltage controlled oscillator (VCO), although that is not a requirement. Divider control input can be provided by either the baseband circuitry 104 or the applications processor 102 depending on the desired output frequency. In some embodiments, a divider control input (e.g., N) can be determined from a look-up table based on a channel indicated by the applications processor 102.

Synthesizer circuitry 106d of the RF circuitry 106 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 106d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 106 can include an IQ/polar converter.

FEM circuitry 108 can include a receive signal path which can include circuitry configured to operate on RF signals received from one or more antennas 110, amplify the received signals and provide the amplified versions of the received signals to the RF circuitry 106 for further processing. FEM circuitry 108 can also include a transmit signal path which can include circuitry configured to amplify signals for transmission provided by the RF circuitry 106 for transmission by one or more of the one or more antennas 110.

In some embodiments, the FEM circuitry 108 can include a TX/RX switch to switch between transmit mode and receive mode operation. The FEM circuitry can include a receive signal path and a transmit signal path. The receive signal path of the FEM circuitry can include a low-noise amplifier (LNA) to amplify received RF signals and provide the amplified received RF signals as an output (e.g., to the RF circuitry 106). The transmit signal path of the FEM circuitry 108 can include a power amplifier (PA) to amplify input RF signals (e.g., provided by RF circuitry 106), and one or more filters to generate RF signals for subsequent transmission (e.g., by one or more of the one or more antennas 110.

In some embodiments, the cell network device 100 can include additional elements such as, for example, memory/storage, display, camera, sensor, and/or input/output (I/O) interface.

In accordance with various embodiments described herein, techniques can be employed to facilitate downlink (DL) licensed assisted access (LAA) for unlicensed band operation in a wireless network. In an LTE network system, for example, if a small cell is considered as the secondary cell (SCell) by all UEs served by it, this small cell may perform state transition between ON/OFF. The Rel-12 discovery reference signal (DRS) was designed to facilitate fast transition from OFF state to ON state, by transmitting minimal signals for radio resource measurements (RRMs) and enable report during the OFF state. DRS includes primary synchronization signal (PSS), secondary synchronization signal (SSS), cell-specific reference signal (CRS), as well as optionally the channel state information reference signal (CSI-RS). DRS measurement timing configuration (DMTC) can be configured by the network device 100 (e.g., an eNB or other cell network device), which can have an occasion of 6 milliseconds (ms) and a periodicity of 40 ms, 80 ms or 160 ms for the occasion to be utilized. UEs communicatively coupled to the network device 100 can expect DRS to be received within the parameters of the DMTC.

In LTE systems, the RRM measurement during the OFF state can be dependent on the DRS as transmitted in a DL transmission. Similarly, DRS can be generated in LAA systems and potentially to standalone LTE systems in the unlicensed spectrum for RRM measurement as well. The DRS transmission in the unlicensed spectrum can be subject to LBT, in which DRS transmission burst can comprise various parameters or characteristics. In LAA network operations, a DRS occasion duration can be 12 symbols in LAA systems. A downlink (DL) transmission burst (which may not start with the DRS) containing DRS without physical downlink shared channel (PDSCH) within the parameters of the DMTC can satisfy the following: a) the DL transmission burst immediately follows a single idle observation interval of at least 25 microseconds (μs); and b) the total duration of the DL transmission burst can be no longer than 1 ms.

In some embodiments, the network device 100 can be configured to facilitate different LBT protocols or method sequences for DRS transmission in unlicensed spectrum. For example, a one shot LBT with a single idle sensing, whose interval can be at least 25 μs, can be performed via the network device 100 before the DRS transmission. In another example, the network device 100 can generate an LBT with a single idle state sensing, whose interval can be at least 25 μs, which can be performed multiple times within a duration of no more than 2 symbols before the DRS transmission.

Figure 2:
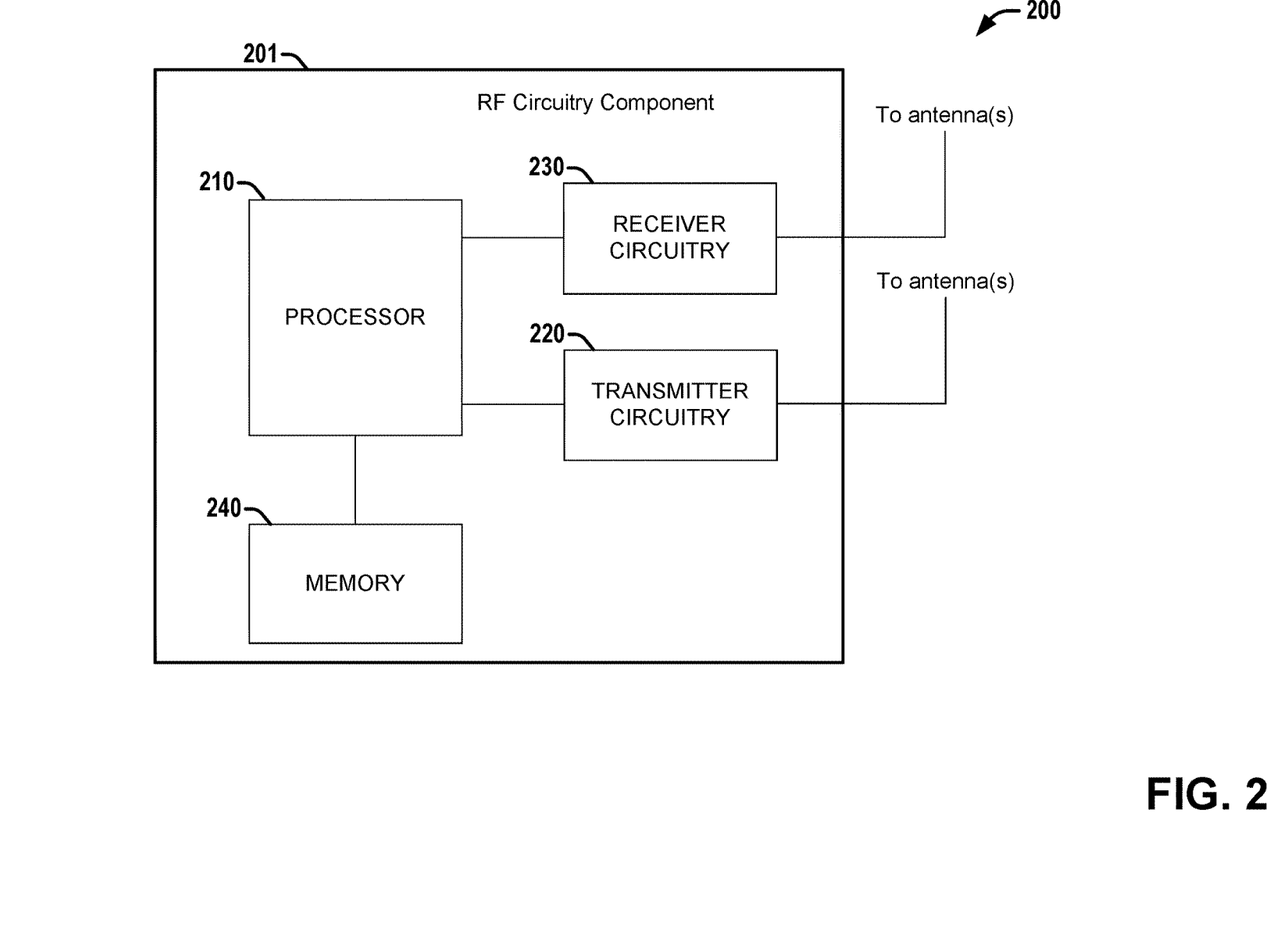
FIG. 2 is a block diagram of a system employable in an enhanced or evolved node B (eNB) or other base station that facilitates listen before talk (LBT) for discovery reference signal (DRS) transmission in unlicensed spectrum according to various aspects described herein.

FIG. 2 further illustrates details a block diagram of a system 200 that facilitates an LBT for an LAA unlicensed band for one or more UEs according to various aspects described herein. System 200 can include a radio frequency (RF) circuitry component 201 with a processor 210, transmitter circuitry 220, receiver circuitry 230, and memory 240. In various aspects, system 200 can be included within an Evolved Universal Terrestrial Radio Access Network (E-UTRAN) Node B (Evolved Node B, eNodeB, or eNB), other base station, network access point, a secondary cell network device (e.g., a small cell, WiFi network device, or a UE) or other cell network component/device in a wireless communications network. Memory 240 also can include instructions that can be implemented by processor 210, transmitter circuitry 220, and/or receiver circuitry 230 to implement various aspects described herein.

In addition, the memory 240 can comprise one or more machine-readable medium/media including instructions that, when performed by a machine or component herein cause the machine to perform acts of the method or of an apparatus or system for concurrent communication using multiple communication technologies according to embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. As described in greater detail below, system 200 can facilitate LBT and DL transmission burst with a DRS for LAA operation in the unlicensed frequency band.

Processor 210 can generate LBT processes or protocol sequences according to LBT parameters or predetermined criteria for the one or more UEs to operate in the unlicensed frequency band. These LBT parameters can include, for example, a single interval indication, a multiple repetition indication, a delay amount, or a reservation signal indication, along with a DRS measurement timing configuration (DMTC) comprising a DRS symbol duration of twelve symbols for LAA. The processor 210, for example, can generate a channel assessment of one or more secondary cell network devices by performing an LBT protocol based on these parameters or predetermined criteria. These parameters can be utilized to determine how LBT protocols can be performed by the RF circuitry component 201.

In response to the channel assessment, the processor 210 can facilitate a transmission of a DRS via the RF circuitry component 201 based on a starting instance, such as within a two symbols of a DL transmission burst. Based on the two symbol limit as a delay amount, the processor 210 can enact LBT until a clear channel is indicated by an idle state, for example. The LBT can be implemented with an interval of about 25 microseconds, or otherwise, within a two symbol amount, for example.

In another embodiment, the LBT can be performed as a one-shot LBT within a two symbol window or otherwise as part of a channel assessment of an unlicensed channel or a secondary device controlling an unlicensed channel. In other words, the LBT protocol can be performed one time in order to generate a channel assessment that determines whether a channel threshold is met for determining idleness or not, and whether a reservation signal should be transmitted along with the DRS transmission, or a DRS transmission alone. If the unlicensed channel is determined in the channel assessment as idle (not busy), then the DRS can be transmitted to a UE or other network device for use. If the one shot LBT determines a busy channel, the processor 210 or RF circuitry component 201 can wait to perform another LBT during another opportunity based on the DMTC (e.g., at 40 ms, 80 ms, or 160 ms).

Additionally or alternatively, a multiplicity of LBT protocols within the delay window (e.g., a two symbol window) can be performed until a success is indicated, or, in other words, an idle state of the unlicensed carrier channel is determined by the channel assessment. A one shot LBT protocol with a single interval sensing before the transmission of the DRS can be based on predetermined criteria, so that the channel assessment can include performing the single interval sensing once with an interval duration of at least about 25 microseconds and performing the single interval sensing multiple times within no more than two symbols of a downlink (DL) transmission burst. The LBT, for example, can be determined within a 25 microsecond channel assessment and done a set number of times, or as many times as possible within a two symbol window. Additionally, the LBT can be performed by the RF circuitry component 201 up within a two symbol amount of a DL transmission, or a set number such as two, three, four or more LBTs within the two symbol duration window.

The channel assessment, for example, can include a determination of whether the unlicensed carrier or channel satisfies a predetermined threshold corresponding to an idle state. If the strength or energy of the channel is above the threshold, for example, then the channel can be determined to be busy. The channel can be determined as idle if below the threshold (i.e., a successful indication for an opportunity for DRS transmission within a DL transmission burst), for example. The threshold can be an energy threshold or other type of channel parameter (signal power, or signal to noise ratio, or the like). A measurement of energy, power, noise, or other parameter for channel measurement can be directly determined by the RF circuitry component 201 as part of the LBT, for example.

The described LBT protocol (i.e., performing once, or repeating multiple times within a 2 symbol duration) can be repeated in periodicity of 1 ms until LBT succeeds or the number of repetitions reaches X times, if DMTC occasion is X, for example, wherein X is a positive integer. For example, the DMTC occasion can equal 6 ms in LAA. Thus, the LBT protocol would be able to be repeated approximately 6 times in total, with each time performed before a subframe boundary (e.g., 1 ms boundary) of the DMTC occasion. If all LBT protocols fail, then the LBT protocol can be repeated after 40/80/160 ms, depending on the DMTC periodicity (e.g., thing in every 1 ms for 6 times, if the DMTC occasion is 6 ms and the periodicity is 40/80/160 ms).

As discussed above, the DL transmission burst containing DRS without PDSCH and within the DMTC can have up to 1 ms duration (or approximately 14 symbols), for example, while the DRS occasion duration can be 12 symbols as in LAA systems (e.g., an eNB, other network device or network system). In this case, there can be a duration of 2 symbols available in the DL transmission burst containing DRS without PDSCH and within the DMTC for the unlicensed channel contention process (e.g., an LBT protocol).

In LAA, the RF circuitry component 201 can facilitate a DRS transmission that is in response to an LBT protocol sequence for channel assessment in the unlicensed spectrum, carrier or channel. In other words, DRS would not be transmitted by the transmit circuitry 220 if the medium (or unlicensed channel) is sensed to be in a busy state during or within the parameters of the DMTC (e.g., an occasion of 6 ms, with a periodicity of 40 ms, 80 ms, or 160 ms), which can result in the degradation of RRM measurement accuracy. In order to increase the transmission opportunities of DRS, the two available symbols in the DL transmission burst containing DRS without PDSCH and within the DMTC can be utilized for LBT and the optional reservation signal.

In one embodiment, the RF circuitry component 201 or the processor 210 can generate the LBT protocol multiple times within a two symbol duration. Each single idle sensing as part of an LBT protocol can comprise an interval of approximately 25 microseconds, or other similar duration, prior to the DRS transmission of a DL transmission burst within the DMTC parameters. The single idle sensing operations can be repeated a number of times in order to avoid a longer wait for another period or periodicity as dictated by the DMTC for another opportunity to generate an LBT. For example, two, three, four or more idle sensing operations can occur within approximately 25 micro seconds each and not more than a duration of two symbols out of the total of 14 symbols for the DL transmission (or not longer than 1 millisecond) within 1 ms in DMTC.

In another embodiment, in response to at least one LBT succeeding or an indication of an idle state from the LBT protocol, the RF circuitry component 201 of the eNB can transmit a reservation signal between the duration after the successful LBT and before the start of DRS transmission (at the sub-frame boundary within the transmissions). For example, the processor 210 can determine whether an alignment or a misalignment exists between the end of the LBT and the beginning of the DRS transmission of the DL transmission burst. This determination can be a result of a precise alignment or within an alignment range/threshold or level of alignment tolerance, for example.

In response to a misalignment being determined, a reservation signal can be transmitted by the transmitter circuitry component 220 to a secondary cell device or small cell network device, in which the reservation signal reserves the unlicensed channel or carrier for a predetermined time (e.g., a symbol interval or the like) in order to account for the misalignment. As such, the DRS can then be communicated to the UE without losing the unlicensed channel to a busy state or on state. The UE is then able to perform RRM measurement with the DRS data.

Transmitter circuitry component 220 can transmit or generate the DRS to one or more UEs during a duration amount of about 6 ms, and the DL transmission burst with DRS without PDSCH data can be no more than 1 ms. In various aspects, the transmitter circuitry component 220 can transmit reserve signals to a secondary cell or small cell network device. The DRS can be transmitted, for example, via a physical downlink control channel (PDCCH), a physical broadcast channel (PBCH), a physical downlink shared channel (PDSCH), etc. In some aspects, transmitter circuitry 220 can send the DRS to one or more UEs via a licensed frequency band, while in other aspects, the unlicensed frequency band employed can be used or another distinct unlicensed frequency band can be employed or a distinct carrier in the unlicensed frequency band. The transmitter circuitry component 220 can further communicate a reservation signal to the network device (e.g., a secondary or small cell network device) of the unlicensed channel, over the unlicensed channel, or otherwise.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases. Moreover, the described methods can be repeated over every 1 ms within DMTC occasion, until an LBT succeeds. If all LBTs fail, i.e., a channel idle state is not sensed or only a busy state is sensed during DMTC occasion, then the LBT protocol can be repeated subsequently based on the DMTC periodicity. Within the DMTC, the LBT can be performed multiple times until succeeds or reached the starting position of the last 12 symbols.

Figure 3:
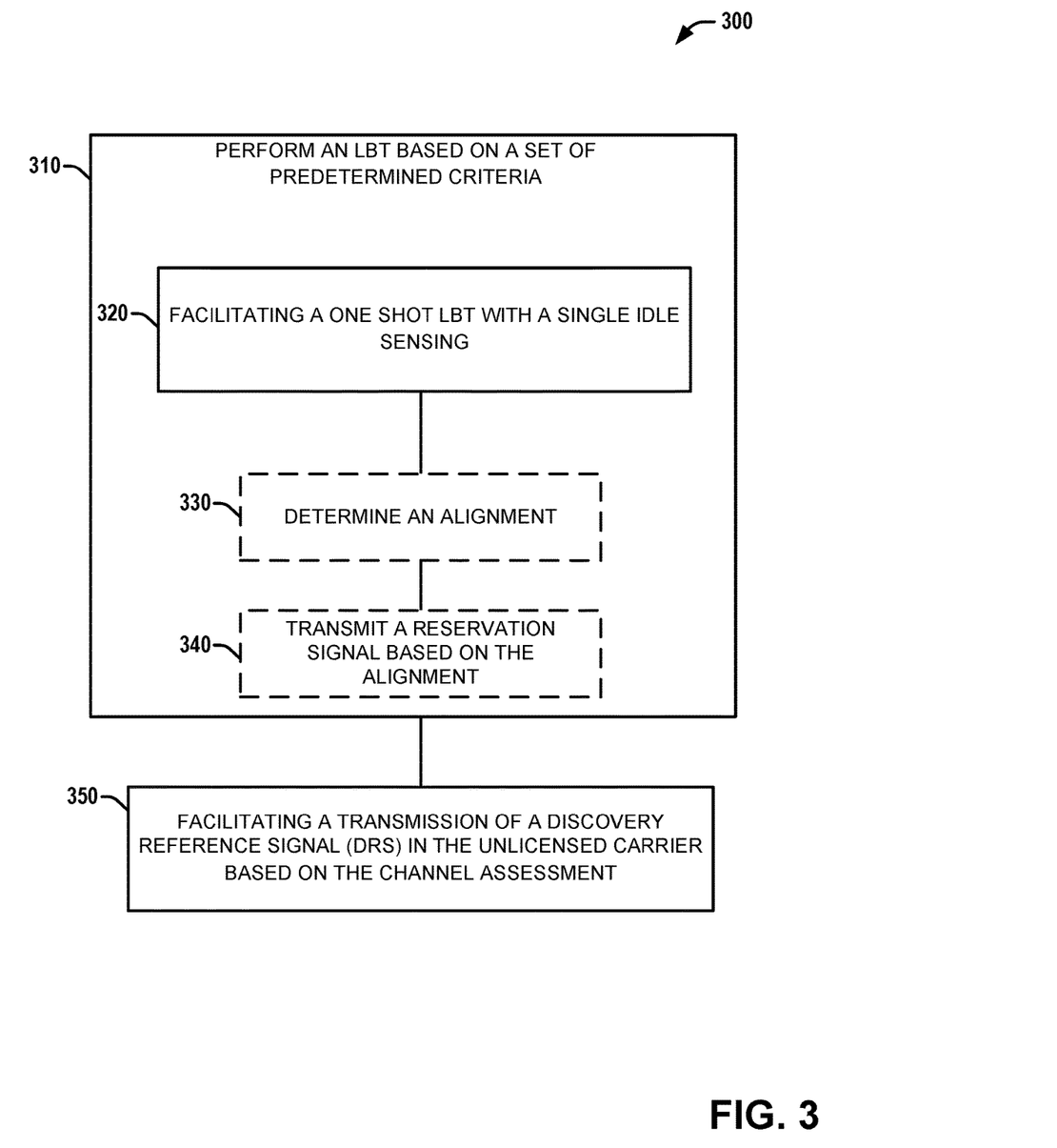
FIG. 3 is a flow diagram illustrating a method of facilitating LBT with DRS transmission in unlicensed spectrum according to various aspects described herein in a licensed assisted access (LAA) wireless system.

Referring to FIG. 3, illustrated is a process flow of a method 300 that facilitates an LBT protocol for a DRS transmission via an LAA unlicensed band operation according to various aspects described herein. In various aspects, method 300 can be implemented by an access point, eNB, other base station or cell network device (e.g., 100 or 200) in a wireless communications network.

The method 300 can initiate at 310 with generating a channel assessment on a channel of an unlicensed carrier by performing a LBT protocol based on a set of predetermined criteria to generate a channel assessment of an unlicensed carrier.

The act at 310 can include one or more additional or alternative acts that can include at 320 facilitating (e.g., via RF circuitry component 201 or processor 210) a one shot LBT with a single idle sensing. The predetermined criteria by which the LBT can be performed, for example, can comprise a single interval sensing for a one shot LBT protocol before the transmission of the DRS, and the generating the channel assessment comprises performing the single interval sensing once with an interval duration of at least about 25 microseconds and not more than a duration of two symbols of a downlink (DL) transmission burst in a duration of 1 ms within DMTC. However, the procedure can also be repeated over the whole DMTC window, if the previous and current LBTs all fail.

Optionally, the act 310 can further comprise at 330 determining an alignment between an ending of a last successful LBT and a beginning of the DRS based on a DMTC.

In response to the determination at 330 of alignment (or misalignment), at 340 a reservation signal can be transmitted (e.g., transmit circuitry 220) to a secondary cell or other network device in order to reserve the unlicensed channel for RRM by a UE or other network device.

At 350, the method comprises facilitating a transmission of a discovery reference signal (DRS) in the unlicensed carrier based on the channel assessment. For example, in response to the channel assessment indicating an idle state, the facilitating the transmission comprises providing the DRS to a transmission path for transmission initiating within the two symbols of the DL transmission burst or at a beginning of the DL transmission burst.

Figure 4:
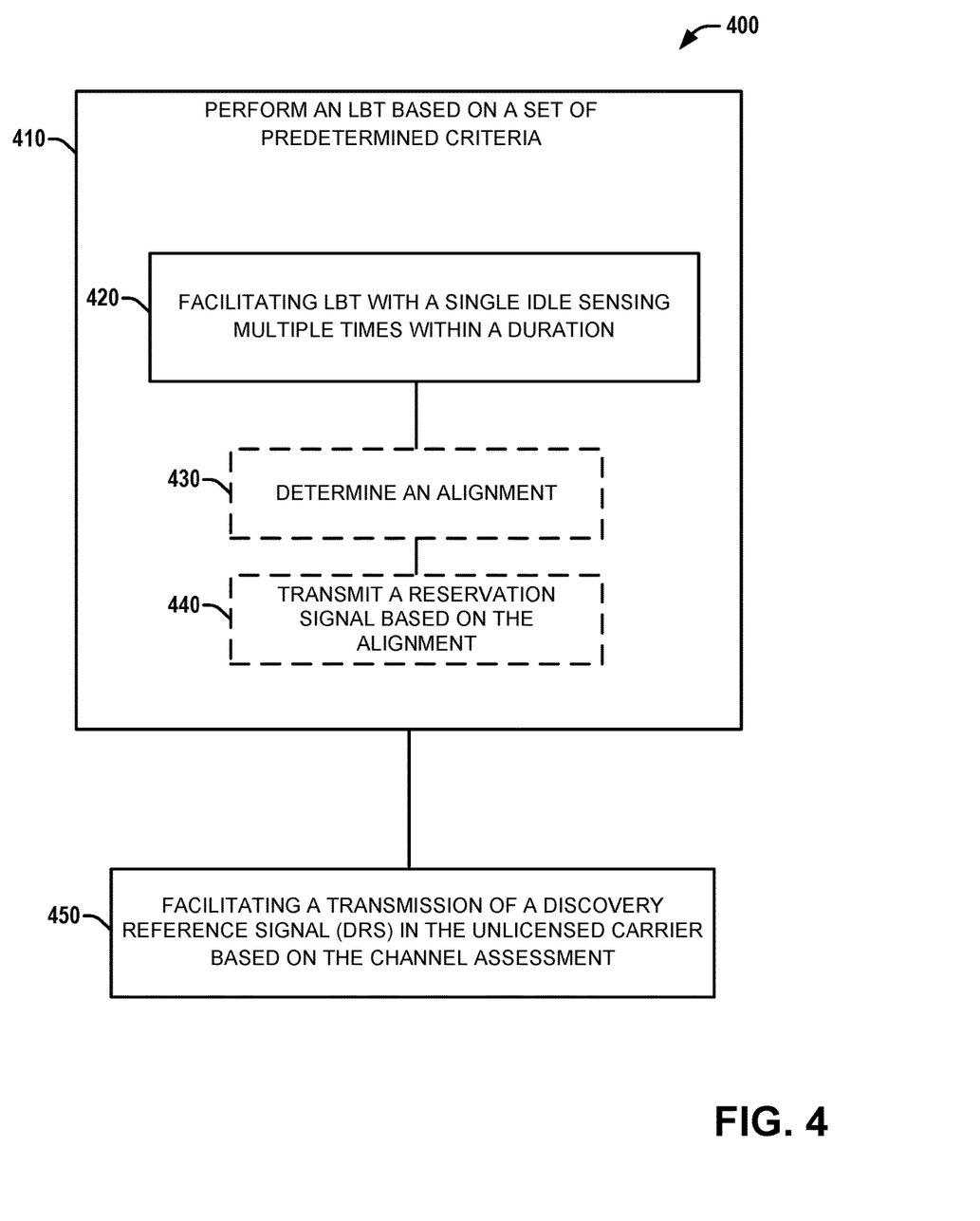
FIG. 4 is a flow diagram illustrating another method of facilitating LBT with DRS transmission in unlicensed spectrum according to various aspects described herein in a LAA wireless system.

Referring to FIG. 4, illustrated is another example process flow of a method 400 for an LBT protocol corresponding to a DRS transmission based on the LBT protocol for an unlicensed band or carrier according to various aspects described herein. In various aspects, method 400 can be implemented by an access point, eNB, other base station or cell network device (e.g., 100 or 200) in a wireless communications network.

The method 400 can initiate at 410 with generating a channel assessment on a channel of an unlicensed carrier by performing a LBT protocol based on a set of predetermined criteria to generate a channel assessment of an unlicensed carrier.

The act at 410 can include one or more additional or alternative acts that can include at 420 facilitating (e.g., via RF circuitry component 201 or processor 210) the LBT protocol multiple times until an idle state of the channel is determined by the channel assessment and within a duration of no more than two symbols of a DL transmission burst. If an idle state is not sensed or only a busy state is sensed during the multiple times within a two symbol duration, then the LBT protocol can be repeated in a subsequent attempt based on the DMTC occasion and periodicity. The described LBT protocol (i.e., performing once, or repeating multiple times within a 2 symbol duration) can be repeated in periodicity of 1 ms for X times, if DMTC occasion is X, for example, wherein X is a positive integer. For example, the DMTC occasion can equal 6 ms in LAA. Thus, the LBT protocol would be able to be repeated approximately 6 times in total, with each time performed before a subframe boundary (e.g., 1 ms boundary) of the DMTC occasion. If all LBT protocols fail, then the LBT protocol can be repeated after 40/80/160 ms, depending on the DMTC periodicity (e.g., in every 1 ms for 6 times, if the DMTC occasion is 6 ms and the periodicity is 40/80/160 ms).

Similar to the method 300 of FIG. 3, act 410 can optionally comprise at 430 determining an alignment between an ending of a last successful LBT and a beginning of the DRS based on a DMTC.

In response to the determination at 430 of alignment (or misalignment), at 440 a reservation signal can be transmitted (e.g., transmit circuitry 220) to a secondary cell or other network device in order to reserve the unlicensed channel for RRM by a UE or other network device.

At 450, the method comprises facilitating a transmission of a discovery reference signal (DRS) in the unlicensed carrier based on the channel assessment. For example, in response to the channel assessment indicating an idle state, the facilitating the transmission comprises providing the DRS to a transmission path for transmission initiating within the two symbols of the DL transmission burst or at a beginning of the DL transmission burst.

In one example, a cell network devices, discussed herein, can also utilize the transmit circuitry component 220 to transmit the DRS within the DMTC window (6 ms) at 40 ms, 80 ms, 160 ms, for instance, from a starting instance to facilitate RRM. The transmission can be for an unlicensed spectrum (e.g., via the transmitter circuitry 220) and subject to LBT protocol, as a channel sensing procedure. The RF circuitry component processor 220, for example, senses the channel, and can transmit only if the channel is sensed to be idle. The LBT protocol in LAA can be based on energy detection. In other words, the RF circuitry component 201 of the eNB system 200 can measure the energy of the unlicensed channel (e.g., a secondary network device channel, a WiFi channel or the like). If an energy or power of the channel being assessed is larger than a predefined threshold, the channel can be determined to be busy, and if the energy is measured to be smaller than the threshold, the channel is sensed to be idle. The transmission can happen only after sensing the channel to be idle, referred to as a successful LBT.

As stated above, the DRS can include 12 symbols that can include data, such as PSS, SSS, CRS, or CSI-RS to facilitate RRM by any number of UEs receiving the DRS transmission. The 12 symbols includes a standalone DRS (without PDSCH) to be transmitted within a DL transmission burst of no more than 1 ms (as corresponding to an opportunity for 14 symbols) within a 6 ms duration. So besides the 12 symbols used for DRS transmission, a duration of 2 more symbols can be used by the RF circuitry component 201 for LBT, as discussed above. Specifically, the DMTC window, which is the duration wherein the DRS is allowed to transmit, can be 6 ms, but the DRS can be transmitted only over 1 ms within this 6 ms duration. In other words, the 6 ms duration can capture the potential transmission opportunity for DRS, but the actually DRS transmission as part of the DL transmission burst occupies 1 ms from this 6 ms duration and be enabled at periodicity corresponding to parameters of the DMTC.

Receiver circuitry 210 can be configured to receive or generate the reservation signal and reserve the unlicensed spectrum for RRM, for example. In addition, the processor 240 can process or generate a reservation signal after the LBT protocol indicates an idle state, which can occur after a one shot LBT protocol with single idle sensing or among an instance from among multiple LBT protocol sequences within a duration of no more than two symbols before the DRS transmission. As described above, the reservation signal can be triggered by a misalignment at an end of an LBT protocol and a start of a DRS transmission, wherein the reservation signal reserves an unlicensed frequency band of the unlicensed spectrum for the DL transmission. Upon the detection of an alignment between the LBT and the DRS, a reservation signal could also not be generated or transmitted, but the DRS transmission could occur as soon as the network device or RF circuitry is able.

Figure 5:
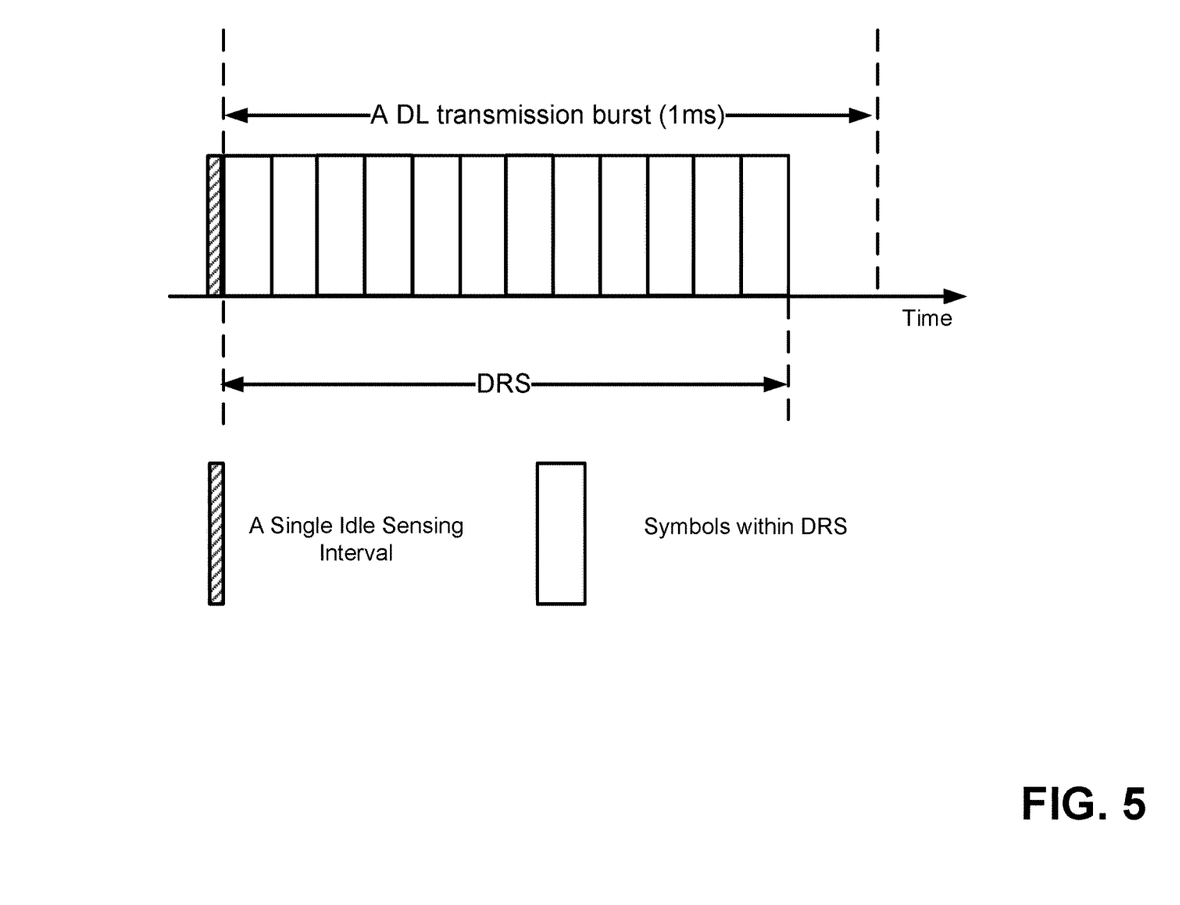
FIG. 5 is a diagram illustrating an example operation of a downlink transmission with LBT for DRS in an unlicensed spectrum of a system or device according to various aspects described herein.
Figure 6:
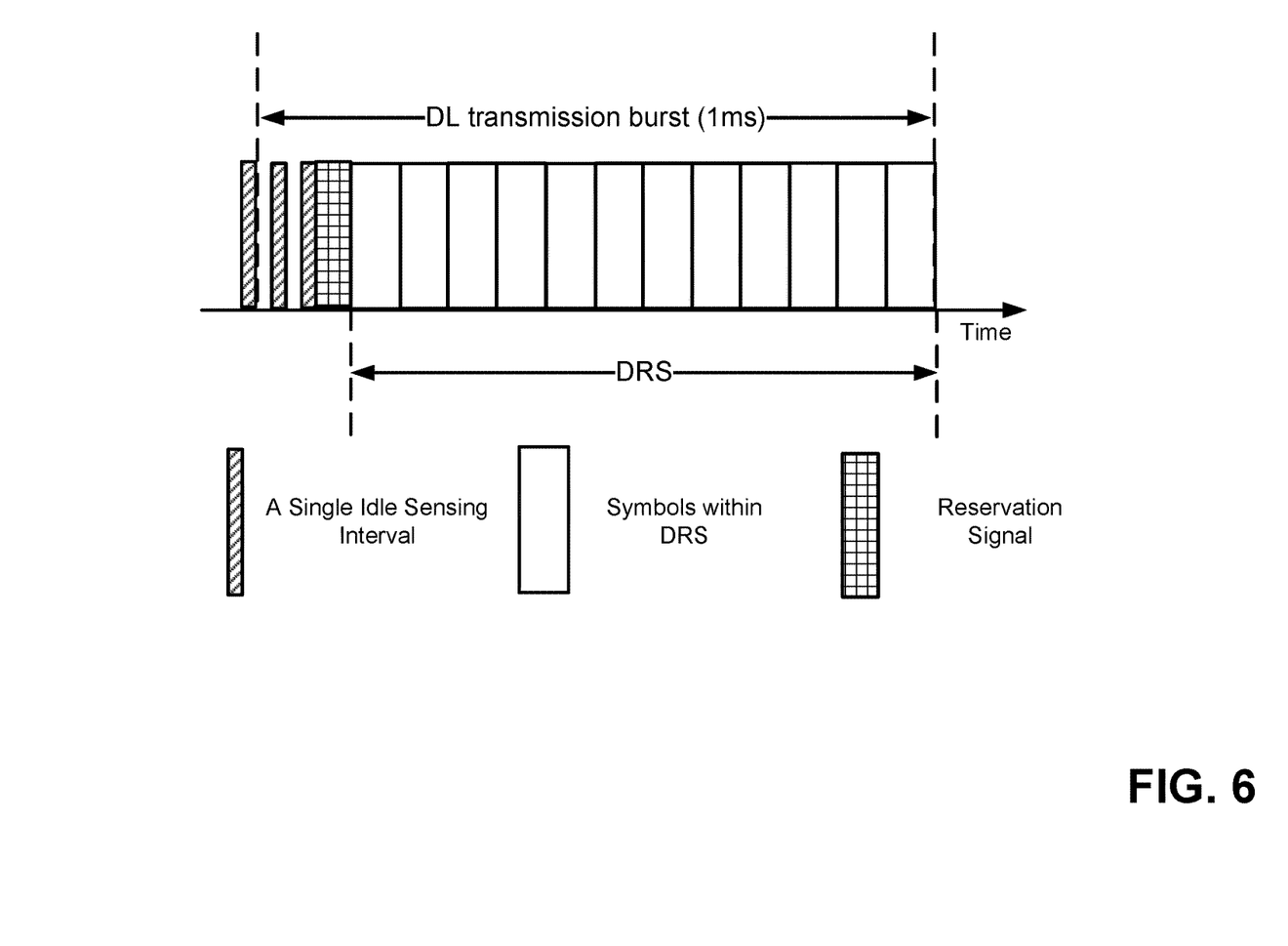
FIG. 6 is another diagram illustrating an example operation of a downlink transmission with LBT for DRS in an unlicensed spectrum of a system or device according to various aspects described herein.

Referring to FIG. 5, illustrated is an example DL transmission for operation of an LBT for DRS transmission in an unlicensed spectrum by an LAA wireless system. In one embodiment, a one shot LBT with a single idle sensing, whose interval is at least 25 μs, can be performed immediately before the DRS transmission. FIG. 5 illustrates an example with a one shot LBT (a single idle sensing interval), where the DL transmission burst starts with DRS. Other embodiments include the case where the DRS starts at any time within the first 2 symbols of the DL transmission burst, and a one shot LBT with a single idle sensing, whose interval is at least 25 μs, is performed right before the DRS transmission FIG. 6 illustrates an embodiment of LBT with a single idle sensing, whose interval is at least 25 μs, can be performed multiple times until succeed before the DRS transmission, which increases the DRS transmission opportunities. Before discussing the possible embodiments of this option, the following notations are introduced: $T_{DRS}$ being the starting time of DRS transmission; $T_{burst}$ being the starting time of DL transmission burst containing the DRS without PDSCH within DMTC; $T_S$ being the OFDM symbol duration+cyclic prefix (CP) length, which is 71.9 μs for first symbols and 71.4 μs for remaining symbols in the LTE system; and $\mathcal{S}$ being the single idle sensing interval of LBT, with $\mathcal{S} \geq 25$.

The $T_{DRS} \in [T_{burst}, T_{burst}+2(T_S)]$, and the LBT can start at $T_{burst}-\mathcal{S}$. Thus, multiple LBT protocols can be performed within the duration from $T_{burst}-\mathcal{S}$ to $T_{DRS}-\mathcal{S}$, e.g., the $i^{th}$ trial LBT can be performed at $T_{burst}+(i-1)\mathcal{S}$ with a single idle sensing interval of $T_{burst}$, where $$i \in \left\{0, 1, \ldots, \left\lfloor \frac{T_{DRS} - T_{burst}}{\delta} \right\rfloor \right\}.$$

In other words, the duration that can be used for additional LBT and can be at most 2 ($T_S$) or corresponding to two symbols of a DRS transmission. If the end of a successful LBT is not aligned with the start of the DRS transmission, a reservation signal can be transmitted starting from the instant after successful completion of the LBT until the time $T_{DRS}$.

In one embodiment, $T_{DRS}$ can be set at $T_{DRS}=T_{burst}+2$ ($T_S$), (i.e., let DRS transmission start at the 3rd symbol of the DL transmission burst), and LBT (LBT protocol) can possibly be performed multiple times within the duration between $T_{burst}-\mathcal{S}$ and $T_{burst}+2$ ($T_S$), until a succeed or idle state is determined, as illustrated in FIG. 6. In another embodiment, if LBT succeeds at some time before the start of DRS transmission, a reservation signal can be transmitted until $T_{DRS}$. In another embodiment, no reservation signal is transmitted between the end of the successful LBT and the start of DRS transmission.

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described.

Example 1 is an apparatus for an evolved NodeB (eNB), comprising: a radio frequency (RF) circuitry component configured to process or generate communication signals on an unlicensed spectrum; and a baseband circuitry component, coupled to the RF circuitry component, configured to generate a channel assessment of one or more secondary cell network devices by performing a listen before talk (LBT) protocol based on a set of predetermined criteria, and in response to the channel assessment, generate or initiate a transmission of a discovery reference signal (DRS) via the RF circuitry component based on a starting instance.

Example 2 includes the subject matter of Example 1-2, wherein the baseband circuitry component is further configured to determine whether a channel is idle by performing the LBT protocol for the channel assessment with a single idle sensing operation, and the RF circuitry component is further configured to transmit the DRS in response to the channel being idle.

Example 3 includes the subject matter of any of Examples 1-2, including or omitting any elements, wherein the set of predetermined criteria comprises at least one of a single interval indication, a multiple repetition indication, a two symbol delay amount, or a reservation signal indication, and a DRS measurement timing configuration (DMTC) that comprises a DRS symbol duration of twelve symbols for licensed assisted access.

Example 4 includes the subject matter of any of Examples 1-3, including or omitting any elements, wherein the starting instance comprises a duration of at least two symbols before the transmission of the DRS.

Example 5 includes the subject matter of any of Examples 1-4, including or omitting any elements, wherein the baseband circuitry component is further configured to determine whether a channel of the one or more secondary cell network devices is idle, and in response to the channel assessment indicating that the channel is in a busy state instead of an idle state, repeat the LBT protocol within a duration of two symbols and until the idle state of the channel is determined.

Example 6 includes the subject matter of any of Examples 1-5, including or omitting any elements, wherein, in response to the channel assessment indicating a busy channel instead of the idle state for the duration of two symbols, the baseband circuitry component is further configured to perform the LBT protocol at a periodicity of 40 ms, 80 ms, or 160 ms according to a DRS measurement timing configuration (DMTC).

Example 7 includes the subject matter of any of Examples 1-6, including or omitting any elements, wherein the baseband circuitry component is further configured to determine whether an end of a last successful LBT and a beginning of the DRS to be transmitted are substantially aligned, and, in response to an alignment, generate the DRS along a transmission path of the RF circuitry.

Example 8 includes the subject matter of any of Examples 1-7, including or omitting any elements, wherein the baseband circuitry component is further configured to generate a reservation signal to the transmission path of the RF circuitry component in response to a misalignment being determined.

Example 9 includes the subject matter of any of Examples 1-8, including or omitting any elements, wherein the baseband circuitry component is further configured to facilitate a downlink (DL) transmission burst with the DRS without a physical downlink shared channel (PDSCH) based on a DMTC that comprises a total duration of the DL transmission burst of about 1 ms or less than 1 ms, and comprises 14 symbols or less than 14 symbols.

Example 10 is a computer-readable storage medium storing executable instructions that, in response to execution, cause a processor of an evolved NodeB (eNB) to perform operations, comprising: generating a channel assessment on a channel of an unlicensed carrier by performing a listen before talk (LBT) protocol based on a set of predetermined criteria to generate a channel assessment of an unlicensed carrier; and facilitating, or providing, a transmission of a discovery reference signal (DRS) in the unlicensed carrier based on the channel assessment.

Example 11 includes the subject matter of Example 10, wherein the operations further comprise transmitting one of the DRS or a reserve signal based on a determination of an alignment between an ending of a last successful LBT and a beginning of the DRS based on a DRS measurement timing configuration (DMTC).

Example 12 includes the subject matter of any of Examples 10-11, including or omitting any elements, wherein the predetermined criteria comprises a single interval sensing for a one shot LBT protocol before the transmission of the DRS, and the generating the channel assessment comprises performing the single interval sensing once with an interval duration of at least about 25 microseconds and performing the single interval sensing multiple times within the duration not more than two symbols of a downlink (DL) transmission burst.

Example 13 includes the subject matter of any of Examples 10-12, including or omitting any elements, wherein in response to the channel assessment indicating an idle state, the facilitating the transmission comprises providing the DRS to a transmission path for transmission initiating within the two symbols of the DL transmission burst or at a beginning of the DL transmission burst.

Example 14 includes the subject matter of any of Examples 10-13, including or omitting any elements, further comprising: in response to the channel assessment indicating an idle state, generating a determination of an alignment between an end of a successful LBT and a beginning of the DRS to be transmitted.

Example 15 includes the subject matter of any of Examples 10-14, including or omitting any elements, wherein the operations further comprise: in response to the alignment, generating the DRS along a transmission path of an RF circuitry component, and, in response to the determination of a misalignment, generating a reservation signal to the transmission path of the RF circuitry component.

Example 16 includes the subject matter of any of Examples 10-15, including or omitting any elements, wherein the operations further comprise: performing the LBT protocol multiple times until an idle state of the channel is determined by the channel assessment and within a duration of no more than two symbols of a DL transmission burst.

Example 17 includes the subject matter of any of Examples 10-16, including or omitting any elements, wherein the operations further comprise: transmitting a reservation signal after an indication of an idle state by the channel corresponding to one or more secondary cell network devices.

Example 18 includes the subject matter of any of Examples 10-17, including or omitting any elements, wherein the operations further comprise: in response to detecting a busy state from the channel assessment after multiple LBT protocols within a two symbol duration, repeating the LBT protocol based on an occasion and a periodicity of a DMTC.

Example 19 is an apparatus for a cell network device operating in an unlicensed spectrum comprising: a radio frequency (RF) circuitry component configured to transmit or receive communication signals on the unlicensed spectrum; and a processor, coupled to the RF circuitry component, configured to generate a listen before talk (LBT) protocol to determine an idle state or a busy state, and in response to being in the idle state, communicate a discovery reference signal (DRS) for radio resource measurement (RRM), which is subject to the LBT protocol, wherein the LBT protocol occurs during a duration of no more than two symbols of a downlink (DL) transmission.

Example 20 includes the subject matter of Example 19, wherein the processor is further configured to detect or communicate the DRS within a DRS measurement timing configuration (DMTC) window of about 6 ms.

Example 21 includes the subject matter of any of Examples 19-20, including or omitting any elements, wherein the processor is further configured to process a reservation signal after the LBT protocol indicates the idle state in response to a misalignment of an end of the LBT protocol and a start of a DRS transmission, wherein the reservation signal is to reserve an unlicensed frequency band of the unlicensed spectrum for the DL transmission.

Example 22 includes the subject matter of any of Examples 19-21, including or omitting any elements, wherein the DL transmission comprises the DRS without a physical downlink shared channel (PDSCH) based on a DMTC window that comprises a total duration of 6 ms and the DL transmission burst including DRS without PDSCH being about 1 ms or less, with the DRS transmission comprising 14 symbols or less.

Example 23 includes the subject matter of any of Examples 19-22, including or omitting any elements, wherein the LBT protocol is based on a set of predetermined criteria comprising a single interval indication, a multiple repetition indication, a two symbol delay amount, or a reservation signal indication, and a DMTC comprising a DRS symbol duration of twelve symbols for a licensed assisted access.

Example 24 includes the subject matter of any of Examples 19-23, including or omitting any elements, wherein the processor is further configured to operate the LBT protocol multiple times within the duration comprising an interval of at least about 25 microseconds and no more than the two symbols of the DL transmission.

Example 25 includes the subject matter of any of Examples 19-24, including or omitting any elements, wherein, in response to a determination of a busy state instead of the idle state for the duration of two symbols, the processor is to generate another LBT protocol at a periodicity of 40 ms, 80 ms, or 160 ms according to a DMTC.

Example 26 includes system for an evolved NodeB (eNB) comprising: a means for generating a channel assessment on a channel of an unlicensed carrier by performing a listen before talk (LBT) protocol based on a set of predetermined criteria to generate a channel assessment of an unlicensed carrier; and a means for facilitating a transmission of a discovery reference signal (DRS) in the unlicensed carrier based on the channel assessment.

Example 27 includes the subject matter of Examples 26, including or omitting any elements, further comprising: a means for transmitting one of the DRS or a reserve signal based on a determination of an alignment between an ending of a last successful LBT and a beginning of the DRS based on a DRS measurement timing configuration (DMTC).

Example 28 includes the subject matter of any of Examples 26-27, including or omitting any elements, further comprising: a means for providing the DRS to a transmission path for transmission initiating within two symbols of the DL transmission burst or at a beginning of the DL transmission burst.

Example 29 includes the subject matter of any of Examples 26-28, including or omitting any elements, further comprising: a means for generating, in response to the channel assessment indicating an idle state, a determination of an alignment between an end of a successful LBT and a beginning of the DRS to be transmitted.

Example 30 includes the subject matter of any of Examples 26-29, including or omitting any elements, further comprising: a means for further generating, in response to the determination of a misalignment, a reservation signal to the transmission path of the RF circuitry component.

Example 31 includes the subject matter of any of Examples 26-30, including or omitting any elements, further comprising: a means for performing the LBT protocol multiple times until an idle state of the channel is determined by the channel assessment and within a duration of no more than two symbols of a DL transmission burst.

Example 32 includes the subject matter of any of Examples 26-31, including or omitting any elements, further comprising: a means for transmitting a reservation signal after an indication of an idle state by the channel corresponding to one or more secondary cell network devices.

Example 33 includes the subject matter of any of Examples 26-32, including or omitting any elements, further comprising: a means for detecting a busy state from the channel assessment after multiple LBT protocols within a two symbol duration, repeating the LBT protocol based on an occasion and a periodicity of a DMTC.

Example 34 is an apparatus for a cell network device operating in an unlicensed spectrum comprising: a processor configured to transmit or receive communication signals on the unlicensed spectrum, generate a listen before talk (LBT) protocol to determine an idle state or a busy state, and in response to being in the idle state, communicate a discovery reference signal (DRS) for radio resource measurement (RRM), which is subject to the LBT protocol, wherein the LBT protocol occurs during a duration of no more than two symbols of a downlink (DL) transmission.

Example 35 is an apparatus for an evolved NodeB (eNB), comprising: a processor configured to process or generate communication signals on an unlicensed spectrum, generate a channel assessment of one or more secondary cell network devices by performing a listen before talk (LBT) protocol based on a set of predetermined criteria, and in response to the channel assessment, generate a transmission of a discovery reference signal (DRS) via the RF circuitry component based on a starting instance.

Example 36 is an apparatus for an evolved NodeB (eNB) comprising: a means for generating a channel assessment on a channel of an unlicensed carrier by performing a listen before talk (LBT) protocol based on a set of predetermined criteria to generate a channel assessment of an unlicensed carrier; and a means for providing a transmission of a discovery reference signal (DRS) in the unlicensed carrier based on the channel assessment.

Example 37 includes the subject matter of Example 36, including or omitting any elements, further comprising a means for transmitting one of the DRS or a reserve signal based on a determination of an alignment between an ending of a last successful LBT and a beginning of the DRS based on a DRS measurement timing configuration (DMTC).

Example 38 includes the subject matter of any of Examples 36-37, including or omitting any elements, wherein the predetermined criteria comprises a single interval sensing for a one shot LBT protocol before the transmission of the DRS, and the generating the channel assessment comprises performing the single interval sensing once with an interval duration of at least about 25 microseconds and performing the single interval sensing multiple times within the duration not more than two symbols of a downlink (DL) transmission burst.

Example 39 includes the subject matter of any of Examples 36-38, including or omitting any elements, wherein, in response to the channel assessment indicating an idle state, the means for providing the transmission comprises a means for providing the DRS to a transmission path for transmission initiating within the two symbols of the DL transmission burst or at a beginning of the DL transmission burst.

Example 40 includes the subject matter of any of Examples 36-39, including or omitting any elements, further comprising: in response to the channel assessment indicating an idle state, a means for generating a determination of an alignment between an end of a successful LBT and a beginning of the DRS to be transmitted.

Example 41 includes the subject matter of any of Examples 36-40, including or omitting any elements, further comprising: in response to the alignment, a means for generating the DRS along a transmission path of an RF circuitry component, and, in response to the determination of a misalignment, a means for generating a reservation signal to the transmission path of the RF circuitry component.

Example 42 includes the subject matter of any of Examples 36-41, including or omitting any elements, further comprising: a means for performing the LBT protocol multiple times until an idle state of the channel is determined by the channel assessment and within a duration of no more than two symbols of a DL transmission burst.

Example 43 includes the subject matter of any of Examples 36-42, including or omitting any elements, wherein the operations further comprise: a means for transmitting a reservation signal after an indication of an idle state by the channel corresponding to one or more secondary cell network devices.

Example 44 includes the subject matter of any of Examples 36-43, including or omitting any elements, wherein the operations further comprise: in response to detecting a busy state from the channel assessment within after multiple LBT protocols within a two symbol duration, a means for repeating the LBT protocol based on an occasion and a periodicity of a DMTC.

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, Flash-OFDML, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

What is claimed is:

1. An apparatus for an evolved NodeB (eNB), comprising:
a radio frequency (RF) circuitry component configured to process or generate communication signals on an unlicensed spectrum; and
a baseband circuitry component, coupled to the RF circuitry component, configured to generate a channel assessment of one or more secondary cell network devices by performing a listen before talk (LBT) process based on a set of predetermined criteria, and in response to the channel assessment, generate a transmission of a discovery reference signal (DRS) via the RF circuitry component based on a starting instance, wherein the starting instance comprises a duration of at least two symbols before the transmission of the DRS.

2. The apparatus of claim 1, wherein the baseband circuitry component is further configured to determine whether a channel is idle by performing the LBT process for the channel assessment with a single idle sensing operation, and the RF circuitry component is further configured to transmit the DRS in response to the channel being idle.

3. The apparatus of claim 1, wherein the set of predetermined criteria comprises at least one of a single interval indication, a multiple repetition indication, a two symbol delay amount, or a reservation signal indication, and a DRS measurement timing configuration (DMTC) that comprises a DRS symbol duration of twelve symbols for licensed assisted access.

4. The apparatus of claim 1, wherein the baseband circuitry component is further configured to determine whether a channel of the one or more secondary cell network devices is idle, and in response to the channel assessment indicating that the channel is in a busy state instead of an idle state, repeat the LBT process within a duration of two symbols and until the idle state of the channel is determined.

5. The apparatus of claim 4, wherein, in response to the channel assessment indicating a busy channel instead of the idle state for the duration of two symbols, the baseband circuitry component is further configured to perform the LBT process at a periodicity of 40 ms, 80 ms, or 160 ms according to a DRS measurement timing configuration (DMTC).

6. The apparatus of claim 1, wherein the baseband circuitry component is further configured to determine whether an end of a last successful LBT and a beginning of the DRS to be transmitted are substantially aligned, and, in response to an alignment, generate the DRS along a transmission path of the RF circuitry.

7. The apparatus of claim 6, wherein the baseband circuitry component is further configured to generate a reservation signal to the transmission path of the RF circuitry component in response to a misalignment being determined.

8. The apparatus of claim 1, wherein the baseband circuitry component is further configured to facilitate a downlink (DL) transmission burst with the DRS without a physical downlink shared channel (PDSCH) based on a DRS measurement timing configuration (DMTC) that comprises a total duration of the DL transmission burst of about 1 ms or less than 1 ms, and comprises 14 symbols or less than 14 symbols.

9. A non-transitory computer-readable storage medium storing executable instructions that, in response to execution, cause a processor of an evolved NodeB (eNB) to perform operations, comprising:
generating a channel assessment on a channel of an unlicensed carrier by performing a listen before talk (LBT) process based on a set of predetermined criteria to generate a channel assessment of an unlicensed carrier;
facilitating a transmission of a discovery reference signal (DRS) in the unlicensed carrier based on the channel assessment; and
transmitting one of the DRS or a reserve signal based on a determination of an alignment between an end of a successful LBT and a beginning of the DRS based on a DRS measurement timing configuration (DMTC).

10. The non-transitory computer-readable storage medium of claim 9, wherein the predetermined criteria comprises a single interval sensing for a one shot LBT process before the transmission of the DRS, and the generating the channel assessment comprises performing the single interval sensing once with an interval duration of at least about 25 microseconds and performing the single interval sensing multiple times within the duration not more than two symbols of a downlink (DL) transmission burst.

11. The non-transitory computer-readable storage medium of claim 10, wherein in response to the channel assessment indicating an idle state, the facilitating the transmission comprises providing the DRS to a transmission path for transmission initiating within the two symbols of the DL transmission burst or at a beginning of the DL transmission burst.

12. The non-transitory computer-readable storage medium of claim 9, further comprising:
in response to the channel assessment indicating an idle state, generating the determination of the alignment between the end of the successful LBT and the beginning of the DRS to be transmitted.

13. The non-transitory computer-readable storage medium of claim 12, wherein the operations further comprise:
in response to the alignment, generating the DRS along a transmission path of an RF circuitry component, and, in response to the determination of a misalignment, generating a reservation signal to the transmission path of the RF circuitry component.

14. The non-transitory computer-readable storage medium of claim 9, wherein the operations further comprise:
performing the LBT process multiple times until an idle state of the channel is determined by the channel assessment and within a duration of no more than two symbols of a downlink (DL) transmission burst.

15. The non-transitory computer-readable storage medium of claim 9, wherein the operations further comprise:
transmitting a reservation signal after an indication of an idle state by the channel corresponding to one or more secondary cell network devices.

16. The non-transitory computer-readable storage medium of claim 9, wherein the operations further comprise:
in response to detecting a busy state from the channel assessment after multiple LBT processes within a two symbol duration, repeating the LBT process based on an occasion and a periodicity of the DMTC.

17. An apparatus for a cell network device operating in an unlicensed spectrum comprising:
a radio frequency (RF) circuitry component configured to transmit or receive communication signals on the unlicensed spectrum; and
a processor, coupled to the RF circuitry component, configured to generate a listen before talk (LBT) process to determine an idle state or a busy state, and in response to being in the idle state, communicate a discovery reference signal (DRS) for radio resource measurement (RRM), which is subject to the LBT process, wherein the LBT process occurs during a duration of no more than two symbols of a downlink (DL) transmission.

18. The apparatus of claim 17, wherein the processor is further configured to detect or communicate the DRS within a DRS measurement timing configuration (DMTC) window of about 6 ms.

19. The apparatus of claim 17, wherein the processor is further configured to process a reservation signal after the LBT process indicates the idle state in response to a misalignment of an end of the LBT process and a start of a DRS transmission, wherein the reservation signal is to reserve an unlicensed frequency band of the unlicensed spectrum for the DL transmission.

20. The apparatus of claim 17, wherein the DL transmission comprises the DRS without a physical downlink shared channel (PDSCH) based on a DRS measurement timing configuration (DMTC) window that comprises a total duration of 6 ms and the DL transmission burst including DRS without PDSCH being about 1 ms or less, with the DRS transmission comprising 14 symbols or less.

21. The apparatus of claim 17, wherein the LBT process is based on a set of predetermined criteria comprising a single interval indication, a multiple repetition indication, a two symbol delay amount, or a reservation signal indication, and a DRS measurement timing configuration (DMTC) comprising a DRS symbol duration of twelve symbols for a licensed assisted access.

22. The apparatus of claim 17, wherein the processor is further configured to operate the LBT process multiple times within the duration comprising an interval of at least about 25 microseconds and no more than the two symbols of the DL transmission.

23. The apparatus of claim 17, wherein, in response to a determination of a busy state instead of the idle state for the duration of two symbols, the processor is to generate another LBT process at a periodicity of 40 ms, 80 ms, or 160 ms according to a DRS measurement timing configuration (DMTC).

* * * * *